March 18, 1930.  F. L. STONE  1,751,427
SYNCHRONOUS MOTOR CONTROL
Filed Sept. 16, 1926
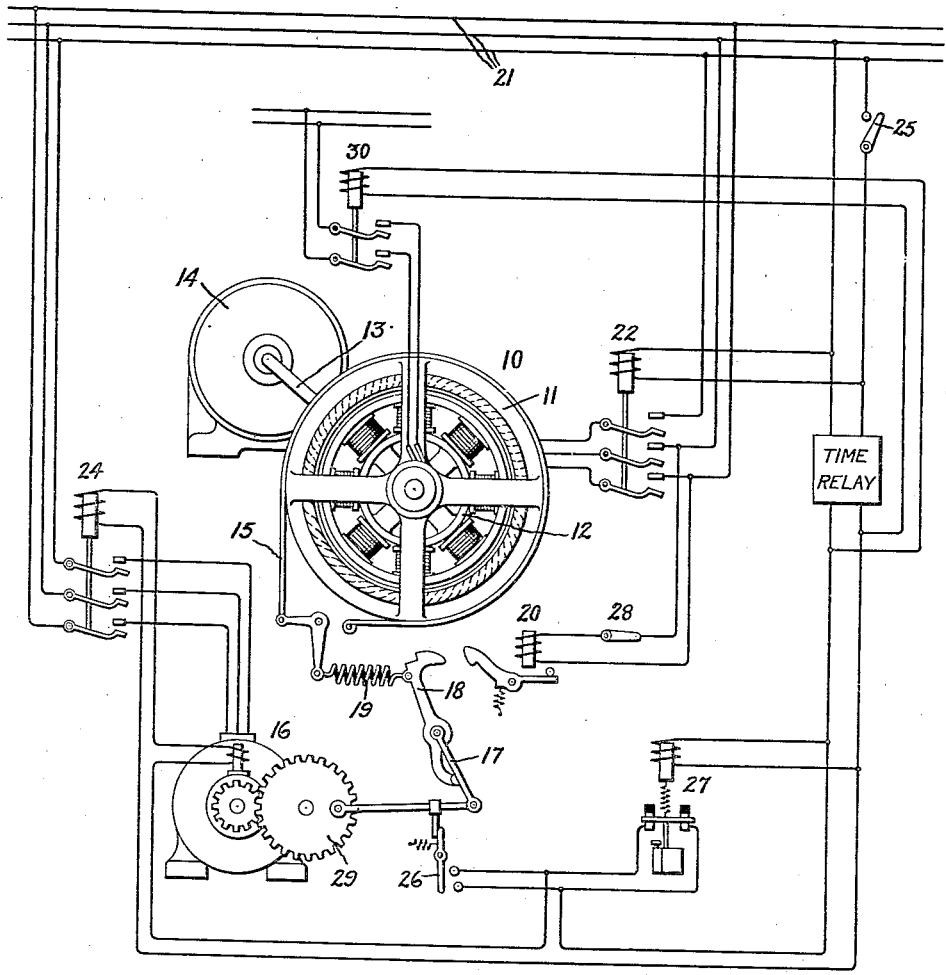
Inventor:
Fred L. Stone;
by
His Attorney.

Patented Mar. 18, 1930

1,751,427

UNITED STATES PATENT OFFICE

FRED L. STONE, OF SCHENECTADY, NEW YORK, ASSIGNOR TO GENERAL ELECTRIC COMPANY, A CORPORATION OF NEW YORK

SYNCHRONOUS-MOTOR CONTROL

Application filed September 16, 1926. Serial No. 135,958.

My invention relates to the control of electric motors and in particular to the control of synchronous motors of the type having rotatable field and armature members.

One of the objects of the invention is to provide a control of the above indicated type, in which the motor is connected to its source of supply, with the member of the motor which is not connected to drive the load arranged so as to freely rotate, and automatically control the retardation of this member of the motor so as to cause the load connected to the other member of the motor to accelerate to full operating speed.

A further object of the invention is to provide a control for a motor of the above indicated type whereby by merely closing a master switch the acceleration of the motor will be automatically accomplished.

A further object of the invention is to provide electroresponsive retaining means for the member of the motor which is not connected to the load (ordinarily the armature member) and energize this retaining means from the source of supply for the motor so that this member of the motor will be released upon power failure.

Another object of the invention is to provide an arrangement whereby upon failure of the power source, the motor will be stopped by the release of said retaining means and automatically accelerated upon the restoration of power.

Further objects of my invention will be apparent to those skilled in the art from a consideration of the following description taken in connection with the accompanying drawing which shows an embodiment of the invention for the purpose of explaining the principles thereof.

Referring to the drawing, the electric motor 10 is indicated as of the synchronous type having a rotatable armature member 11 and a rotatable field member 12. The field member is mounted on the shaft 13 and is arranged to drive the load 14 which may be any machine, a fan, or other type of load as the occasion may demand. The armature member 11 is provided with a friction brake which is indicated as a band 15 practically encircling the outer periphery of the armature member 11. While I have indicated a band brake for the purpose of bringing the armature member to rest, I would have it understood that my invention is not necessarily limited to this type of brake since other types of brake are equally applicable. The brake band 15 is normally in its released position and is applied through the action of the brake applying electric motor 16. This motor is connected through gearing, as indicated, to an operating lever 17 which co-acts with the lever 18 through the spring 19 in applying the brake. The lever 18 is retained in its brake applying position by means of the electromagnetic detent, or maintaining means 20, the winding of which is energized from a phase of the three phase source of supply 21 for the motors 10 and 16.

The armature of the motor 10 is connected to the source of supply 21 through the electromagnetic switch or the contactor 22. The brake applying motor 16 is connected to the three phase source of supply 21 by means of the contactor 24. The contactors 22 and 24 are under the control of a master switch 25 which is located in any suitable place so as to be convenient to the operator. The brake applying motor 16 is controlled by means of the limit switch 26, the time relay, and the time element switch 27. The switch 26 is connected so that after the motor 16 is operated through a predetermined cycle in effecting the application of the brake to the armature 11, the brake applying motor will automatically be deenergized and be in a position ready for its next brake applying operation.

As thus constructed and arranged, and with the various members in their respective positions as indicated on the drawing, the operation of my invention is as follows:—

With the pilot switch 28 in its closed position, the winding of the electromagnetic detent 20 will be energized so as to retain its plunger in its upper position and the detent will be in its position as indicated. Upon closing the master switch 25, the contactor 22 will be energized to close and connect the armature of the motor 10 to the three phase source of supply 21. The energization of the line contactor 24 for the brake supplying motor 16 and the field contactor 30 will be delayed by the time relay. Since the field member 12 of motor 10 is connected to the load 14, and since the armature member 11 of this motor is free to rotate, the load will not be accelerated until the brake is applied to the armature member 11 although the armature member 11 will be caused to rotate by reason of the fact that there will be an induction motor action effected by the amortisseur winding on the field member. After the armature 11 is up to speed, the time relay will operate and energize contactors 24 and 30. Motor 16 will operate the lever 18 in a clockwise direction, thereby through the spring 19 applying a braking effect to the armature member 11. After the motor 16 has operated a predetermined extent the limit switch 26 will be closed so that the contactor 24 for the brake applying motor 16 will be maintained energized through this limit switch after the time element contacts 27 have broken the electrical circuit therethrough. When the lever 18 has been operated to the brake applied position, the electromagnetic detent 20 will retain the same therein independently of the motor 16 until failure of the source of supply 21 or until the pilot switch 28 is opened. By interposing the spring 19 between the brake applying motor 16 and the brake band 15, I am able to obtain a gradual application of the brake which, in turn, effects a gradual acceleration of the load 14.

When the gear 29 rotates through a half revolution, the lever 18 will be operated to its brake applied position, and since this lever is maintained in this position by the electromagnetic detent 20, the lever 17 will be returned to its position as indicated in the drawing, at the completion of the next half revolution of the gear 29. This final movement of the gear 29 and the lever 17 will not effect any control of the brake on the armature 11, but in the final movement of the gear 29, the limit switch 26 will be opened so as to interrupt the energizing circuit of the brake applying motor contactor 24. The brake applying motor 16 will thus be deenergized and be in a position ready to again apply the brake 15.

The energization of the motor field winding from its direct current source of supply is delayed for a time interval after the energization of the armature winding in order that the armature may accelerate so that when the field is energized the armature and field members may pull into synchronous relation. This is accomplished in any suitable way, as for example, by means of the time element relay indicated as such on the drawing. The relay controls the energization of the field contactor 30 and brake applying motor contactor 24. Any suitable type of time element relay may be used and since relays of this sort are well known I have not shown the details thereof. The relay is set in operation by the closing of the master switch 25.

In case of failure of the power supply 21, the electromagnetic detent 20 will release the brake band 15 and the driven load 14 will come to rest. It is also to be observed that in case of power failure the contactor 22 will automatically open, thereby disconnecting the windings of the armature member 11 of motor 10 from the source of supply 21. The field winding is automatically disconnected from its supply by the automatic opening of the contactor 30. When the supply of power is resumed, the contactors 22 and 24 will be automatically closed and the load 14 will be accelerated as before explained. The time element relay is of the automatic re-setting type arranged to repeat its operation. This automatic re-starting of the motor is of advantage where the motor 10 is arranged to drive a load, such as a mine fan located at an out of the way place. The fan can be started by the operator through the control effected by means of the master switch 25, and in case the power fails and is resumed at some later time, the fan will be automatically accelerated and brought up to full operating speed without any attention on the part of the operator. The load can be stopped at any time by opening the pilot switch 25.

What I claim as new and desire to secure by Letters Patent of the United States, is:—

1. In combination, a synchronous motor having a rotatable field and armature members, one of said members being arranged to drive a load, a brake for the other of said members, a supply circuit for said armature member, switching means for controlling the connections between said armature and said supply circuit, means for controlling the operation of said brake and means dependent upon an electrical condition in said supply circuit for controlling said switching means and said brake controlling means so that said armature is disconnected from said supply circuit and said brake is released upon a failure of the source of supply and upon resumption of the power of the supply circuit, the connections between said armature and said supply circuit are reestablished and said brake is reapplied.

2. In combination, a synchronous motor having rotatable field and armature members, switch mechanism for establishing power connections for said members, one of said members being arranged to drive a load, a brake for the other of said members, a source of power for said armature member, and electroresponsive means controlled by said source for opening said switch mechanism and effecting automatic release of said brake upon failure of said source and an automatic closing of said mechanism and reapplication of the brake upon resumption of the power of said source.

3. In combination, an electric motor having rotatable field and armature members, switch mechanism for establishing power connections for said members, one of said members being arranged to drive a load, a brake for the other of said members, means for effecting an application of said brake, and a common time element control for said field switch mechanism and said brake applying means.

4. In combination, an electric motor having rotatable field and armature members, one of said members being arranged to drive a load, a brake for the other of said members, a motor for effecting an application of said brake to retard said other member, and a control for said brake applying motor for automatically stopping the same after a predetermined cycle of operation.

5. In combination, a synchronous motor having rotatable field and armature members, one of said members being arranged to drive a load, a brake for the other of said members, electroresponsive means for effecting application of said brake, a resilient connection between said means and said brake, and an electroresponsive detent which maintains said brake applied.

6. In combination, a synchronous motor having rotatable field and armature members, one of said members being arranged to drive a load, a brake for the other of said members, electroresponsive means for effecting application of said brake, a source of power for said motor, and electroresponsive means energized from said source for maintaining said brake applied until failure of said source.

7. In combination, a synchronous motor having rotatable field and armature members, one of said members being arranged to drive a load, a brake for the other of said members, a brake applying motor, a resilient connection between said brake applying motor and said brake, switch mechanism for establishing power connections for said members and said brake applying motor, a control for said brake applying motor for automatically stopping the same after a predetermined cycle of operation, a source of power for said motors, and electroresponsive means energized from said source for maintaining said brake applied until failure of said source.

8. In combination, a synchronous motor having rotatable field and armature members, one of said members being connected to drive a load, a brake for the other of said members, separate electrical sources of supply for said field and armature members, means responsive to the voltage of said armature supply source for disconnecting said field and armature members from their respective supply sources and releasing said brake upon a failure of said supply source, and for connecting said armature to said supply source upon a resumption of said supply source, and time controlled means for connecting said field member to its supply source and applying said brake a predetermined interval after the connection of said armature.

In witness whereof, I have hereunto set my hand this 15th day of September, 1926.

FRED L. STONE.